United States Patent [19]
Gouali et al.

[11] Patent Number: 4,708,425
[45] Date of Patent: Nov. 24, 1987

[54] BIDIRECTIONAL OPTICAL WAVELENGTH MULTIPLEXER-DEMULTIPLEXER

[75] Inventors: Mohamed Gouali, Paris; Gerald Roullet, Igny; Oliver Voisin, Conflans Ste Honorine, all of France

[73] Assignee: Lignes Telegraphiques et Telephoniques Ltt, Conflans Ste Honorine, France

[21] Appl. No.: 658,688

[22] Filed: Oct. 9, 1984

[30] Foreign Application Priority Data

Oct. 11, 1983 [FR] France .............................. 83 16138

[51] Int. Cl.$^4$ .............................................. G02B 6/28
[52] U.S. Cl. .............................. 350/96.16; 350/96.18; 370/3
[58] Field of Search ............... 350/96.16, 96.18, 96.15; 370/3, 1

[56] References Cited

U.S. PATENT DOCUMENTS

| | | | |
|---|---|---|---|
| 4,198,117 | 4/1980 | Kobayashi | 370/3 |
| 4,449,782 | 5/1984 | Korth | 350/96.16 |
| 4,522,462 | 6/1985 | Large et al. | 350/96.18 X |
| 4,550,975 | 11/1985 | Levinson et al. | 350/96.18 |

FOREIGN PATENT DOCUMENTS

| | | |
|---|---|---|
| 0071309 | 2/1983 | European Pat. Off. |
| 2454634 | 11/1980 | France |
| 2499723 | 8/1982 | France |
| 0138453 | 10/1979 | Japan .............................. 350/96.18 |

OTHER PUBLICATIONS

Metcalf et al., "High-Capacity Wavelength Demultiplexer with a Large-Diameter GRIN Rod Lens," *Applied Optics*, vol. 21, No. 5 (Mar. 1982), pp. 794–796.

Sono, K., et al., "Graded-Index Rod Lenses," *Laser Focus*, vol. 17, No. 2, (Feb. 1981), pp. 70–74.

Conference Europeenne Sur Les Communications Optiques, 21–24 Sep. 1982, Cannes, France; E. Pelletier et al: "Filtres Optiques Interferentiels Pour Multiplexeurs et Demultiplexeurs Destines Aux Communications Par Fibres", pp. 532–536; p. 533, 1s, 27–50.

Conference Europeenne Sur Les Communications Optiques, 21–24 Sep. 1982, Cannes, France; G. Winzer: "Multiplexage de Longuers d'Ondes-Situation et Tendances", pp. 305–314, tableau 1; FIGS. 4, 6.

Siemens Forsch.-U. Entwickl.-Ber., vol. 8, No. 3, 1979, Springer-Verlag; D. Rosenberger: "Microoptic Passive Devices for Multimode Optical Fiber Communication Systems", pp. 125–129, FIGS. 7, 9.

*Primary Examiner*—John Lee
*Attorney, Agent, or Firm*—Oblon, Fisher, Spivak, McClelland, & Maier

[57] ABSTRACT

A bidirectional optical wavelength multiplexing-demultiplexing device comprises a self-focusing lens having an index gradient and situated between the transmission fibre and filtering means and of which the length is such that the spatial separation between the outgoing wavelengths and the return wavelength is maximum, which permits decoupling of the return channel from the outgoing channels.

12 Claims, 8 Drawing Figures

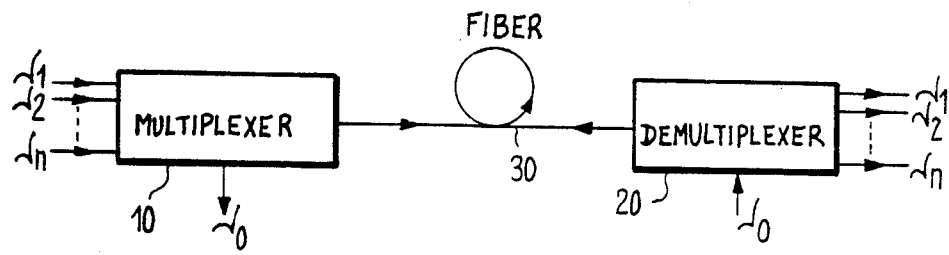
FIG_1
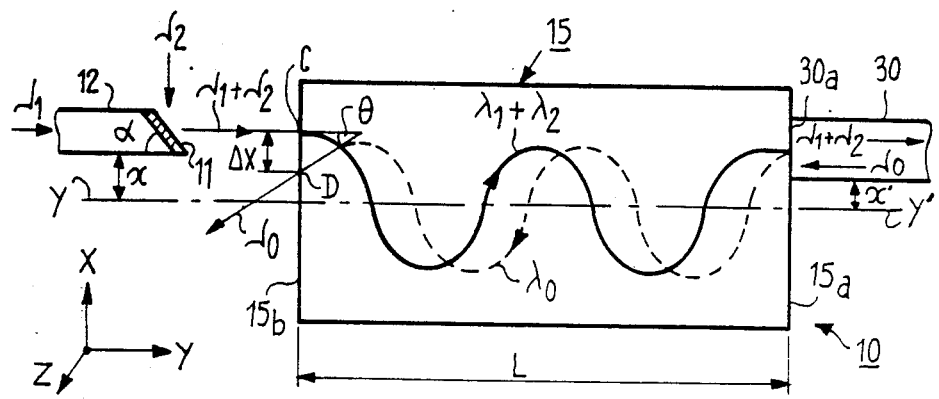
FIG_2
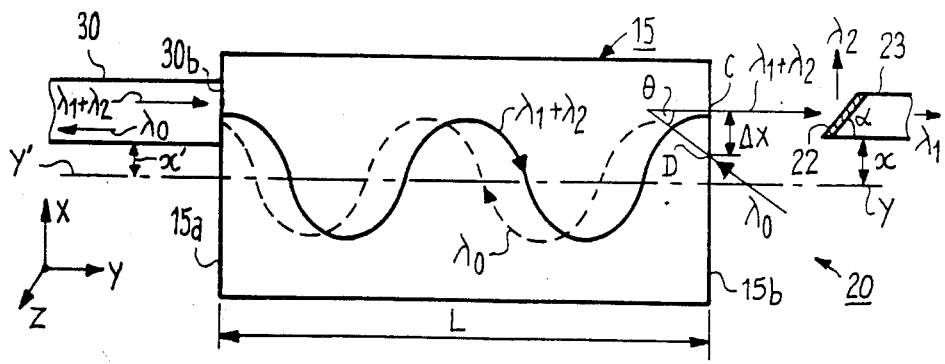
FIG_3

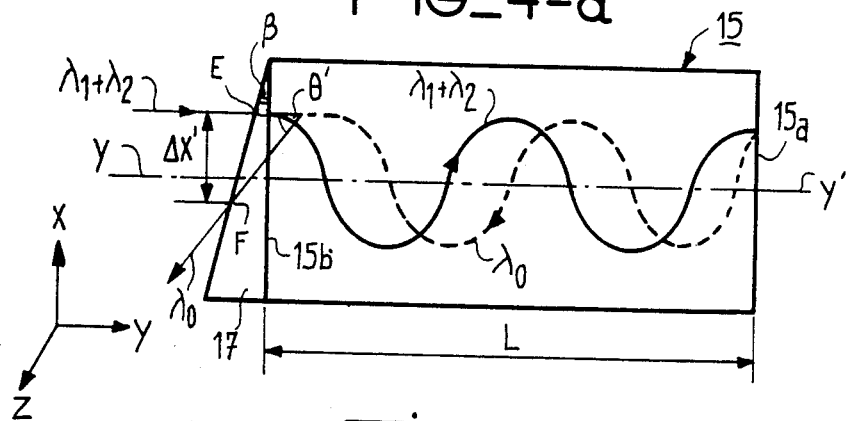
FIG_4-a
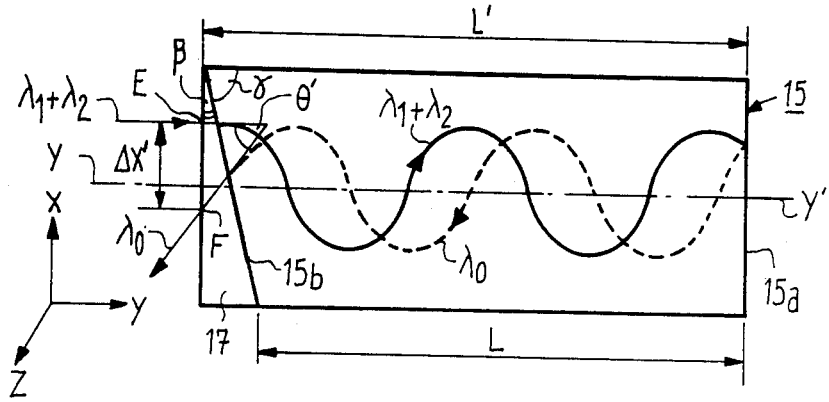
FIG_4-b
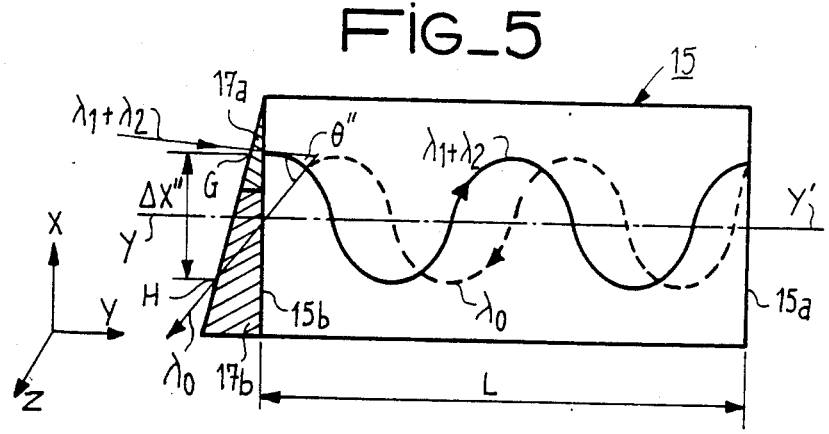
FIG_5

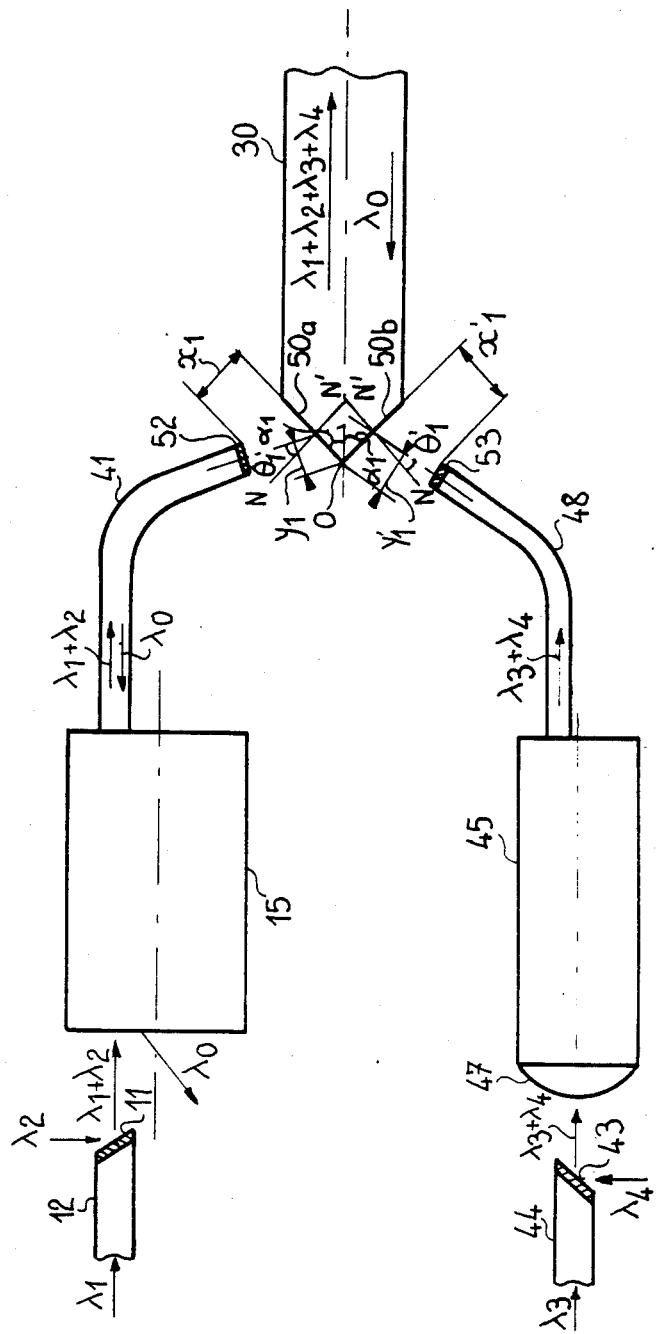

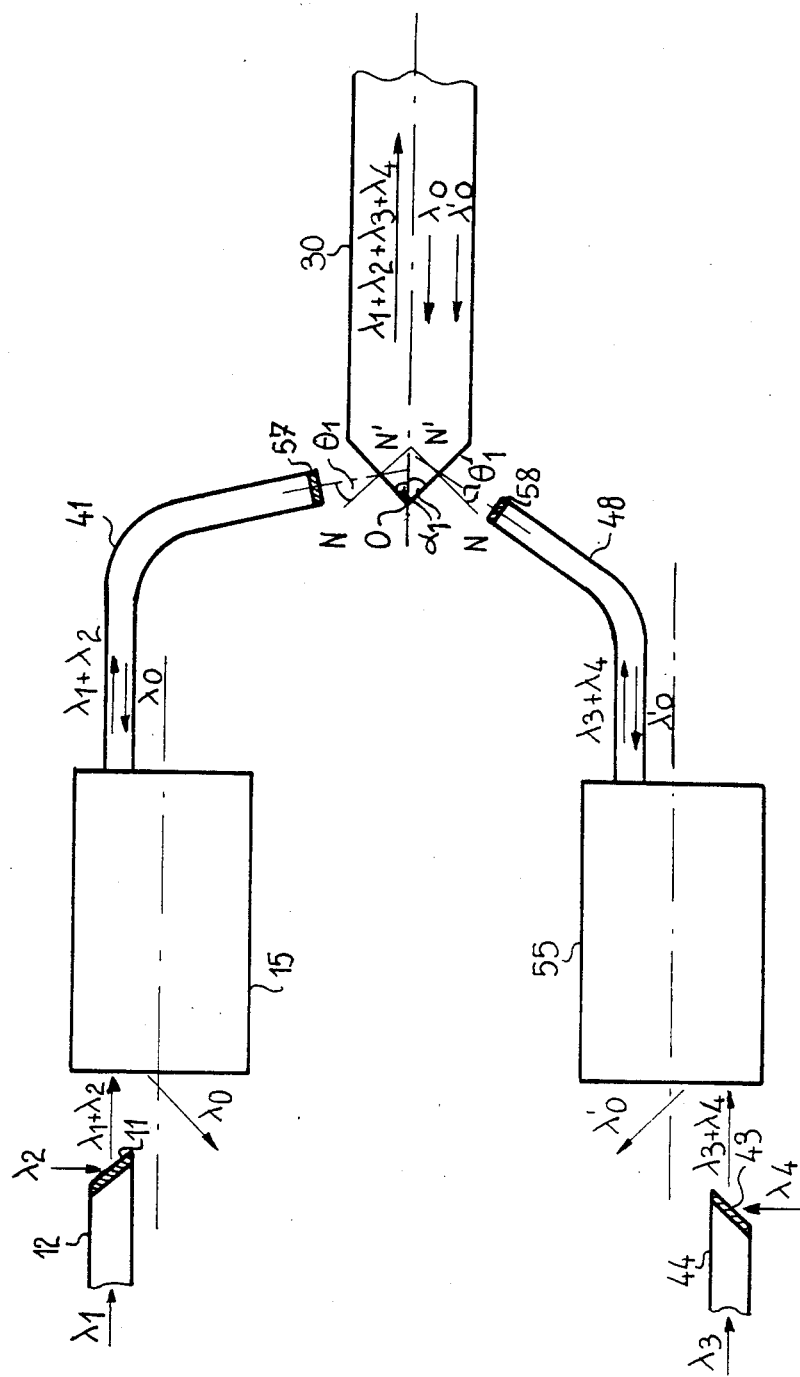
FIG_7

BIDIRECTIONAL OPTICAL WAVELENGTH MULTIPLEXER-DEMULTIPLEXER

The present invention relates to a bidirectional optical wavelength multiplexer-demultiplexer.

BACKGROUND OF THE INVENTION

In optical transmission systems, signals of different wavelengths modulated in each case by the data to be transmitted need to be multiplexed in a single main optical fibre referred to as a connection or transmission fibre, and conversely. Optical systems of this nature are referred to as being unidirectional or monodirectional, if the different wavelengths are propagated in one direction only of the connecting fibre, and as being bidirectional if the connecting fibre transmits different so-called outgoing wavelengths in one direction, and one or more so-called return wavelengths in the other direction. At the present time, use is made of bidirectional optical connection systems in numerous spheres such as for example automatic teletransmission, telephone transmissions or teledistribution networks in which a central station is in communication with peripheral stations formed by subscribers' transceiver apparatus.

Different kinds of optical multiplexer-demultiplexer for wavelength transmission lines or channels on a single bidirectional connection fibre are already known. One of these, intended for a bidirectional connection, which for example has three channels, of which two are outgoing and another for return, is formed by two interferential filters comprising multiple dielectric layers placed in alignment, respectively, with the two extremities of the connecting fibre. Each of the two filters performs a dual function being in the one case, the actual multiplexing of the two outgoing channels by distribution into wavelengths and extraction from the return channel, and in the case of the other filter, the actual demultiplexing of the two outgoing channels by selection following propagation in the fibre and transmission of the return channel into the fibre.

However, a bidirectional optical multiplexing-demultiplexing device of this kind has disadvantages. In particular, the fact that the extraction from the return channel is effected by the same interferential filter for multiplexing of the two outgoing channels, and similarly so far as concerns the transmission of the return channel by the same interferential filter for demultiplexing of the two outgoing channels causes a substantial rejection of the return channel on each of the outgoing channels and consequently increases co-channel interference. As a result, each of the filters performing a dual function cannot perform a correct separation of the return channel from the outgoing channels which is particularly troublesome regarding reproduction of the different data. Furthermore, this device is not produced in a compact form, that is to say with little bulk.

The present invention has as its object to remedy these disadvantages by proposing an optical multiplexer-demultiplexer for a bidirectional connection, which permits a substantial reduction of co-channel interference and is provided in a compact form, that is to say of little bulk.

SUMMARY OF THE INVENTION

Thus, for a bidirectional connnection, that is to say for a single connecting fibre transmitting at least two outgoing wavelengths in one direction, and at least one return wavelength in the other direction, the invention provides a multiplexer-demultiplexer comprising optical filtering means for the multiplexing-demultiplexing of the outgoing wavelengths and a self-focusing lens of refractive material incorporating an index gradient situated between the filtering means and the connecting fibre, the lens having a length such that the spatial difference between the light beam at the outgoing wavelength and that of the return wavelength, is maximum.

It will be understood that the index-gradient self-focusing lens will make it possible by an appropriate selection of its length and by virtue of its intrinsic physical properties, to perform a maximum separation or decoupling of the return wavelength from the outgoing wavelengths as regards multiplexing as well as in respect of demultiplexing, and this without any action of the filtering means on the return wavelength, which will endow the multiplexer-demultiplexer with excellent overall performance factors (minimum insertion loss and co-channel interference). As a result, the filtering means will henceforth each perform only a single function instead of two as in the prior art, being the actual multiplexing or demultiplexing of the outgoing wavelengths, whereas the functions of extracting the return wavelength at the multiplexing side and its transmission at the demultiplexing side, will be performed by another and identical intermediate means, being the self-focusing lens.

BRIEF DESCRIPTION OF THE DRAWINGS

Other features and advantages of the invention will appear more clearly from the following detailed description in conjunction with the accompanying drawings, given solely by way of example, and in which:

FIG. 1 illustrates a general arrangement of a multiplexing-demultiplexing system for a bidirectional connection by optical fibre, FIGS. 2 and 3 respectively illustrate views in longitudinal cross-section of the multiplexer and associated demultiplexer in accordance with the invention, for a bidirectional connection via three channels of which two are outgoing and one is a return channel, FIGS. 4a, 4b and 5 illustrate different forms of the index gradient lens utilised at the multiplexing side for the bidirectional three-channel connection, FIG. 6 illustrates a view in longitudinal cross-section of the multiplexer for a bidirectional connection comprising five channels of which four are outgoing and one is a return channel, and FIG. 7 illustrates a view in longitudinal cross-section of the multiplexer for a bidirectional connection comprising six channels of which four are outgoing and two are return channels.

The same references are used for the same elements in these different figures.

DETAILED DESCRIPTION OF THE PREFERRED EMBODIMENT

In FIG. 1 there has been illustrated at 10 a multiplexer for n different wavelengths $\lambda_1 \lambda_2 \ldots \lambda_n$, and at 20 the associated demultiplexer, for example for a teledistribution system on a single main optical fibre 30 referred to as a connection or transmission fibre.

The optical connection is referred as bidirectional if the optical fibre 30 transmits:

in one direction from the multiplexer 10 to the demultiplexer 20, the light signals at the n wavelengths $\lambda_1 \lambda_2 \ldots \lambda_n$ emitted by photoemitter diodes, for example laser diodes or electroluminescent diodes (not illustrated) and received by photodetector diodes, for example avalanche photodiodes or PIN type photodiodes (not illustrated), and in the other direction, one or more return wavelengths of which one only has been illustrated at $\lambda_0$ in FIG. 1, the same being emitted by a photoemitter diode (not illustrated) coupled to the demultiplexer 20 and received by a photodetector diode (not illustrated) coupled to the multiplexer 10.

In this way, for example for a teledistribution system, the multiplexing-demultiplexing device as illustrated in FIG. 1 is bidirectional and comprises (n+1) transmission channels or paths, meaning n outgoing channels for the transmission of video signals at the wavelengths $\lambda_1$ $\lambda_2 \ldots \lambda_n$ and a single return channel for the transmission of a supplementary signal, for example a remote control signal at the wavelength $\lambda_0$.

FIGS. 2 and 3 respectively illustrate the multiplexer 10 and the associated demultiplexer 20 in accordance with the invention for bidirectional optical connection which, for example, has three channels of which two are outgoing channels and one is a return channel. The two different outgoing wavelengths $\lambda_1$ and $\lambda_2$ are equal, respectively, for example, to 0.86 micron and to 1.3 micron, whereas the return wavelength $\lambda_0$ different from the two others is for example equal to 0.78 micron.

The optical multiplexer 10 illustrated in FIG. 2 firstly comprises optical filtering means for the actual multiplexing of the two outgoing wavelengths $\lambda_1$ and $\lambda_2$, for example formed by a multilayer dielectric interferential filter 11 which is deposited on the outlet face chamfered to an angle $\alpha$ of given value, for example of the order of 45°, and polished, of an intermediate multimode optical fibre 12 of the index jump or index gradient type, such as for example a 50/125 micron fibre.

The intermediate fibre 12 transmits for example the optical signal at the first outgoing wavelength $\lambda_1$, whereas the optical signal at the second outgoing wavelength $\lambda_2$ is, for example, injected directly into the filter. Thus, the interferential filter 11 is devised in such a manner as to operate transmissively for the wavelength $\lambda_1$ after propagation in the fibre and by reflection for the wavelength $\lambda_2$, so that the filter generates the multiplexing of the two outgoing wavelengths $\lambda_1$ and $\lambda_2$ by allocation into wavelengths and at its output side generates an optical signal at the two outgoing multiplexed wavelengths.

As is apparent from FIG. 2, the optical connecting fibre 30 is bidirectional, meaning that it transmits the multiplexed two outgoing wavelengths $\lambda_1+\lambda_2$ in one direction, and the return wavelength $\lambda_0$ in the other direction. The optical fibre 30 has a surface 30a which acts both as an input surface for the optical signal at the two multiplexed outgoing wavelengths $\lambda_1+\lambda_2$, and as an output surface for the optical signal at the return wavelength $\lambda_0$ after propagation in the fibre 30. This latter is a multimode fibre of the index jump or index gradient type, for example such as a 100/140 micron fibre for which the numeric aperture is of the order of 0.25 to 0.29.

The multiplexer 10 moreover comprises a self-focusing lens 15 in the form of a cylindrical bar having the longitudinal axis YY', and produced from a refractive material having an index gradient, such as for example glass, and delimited by two plane and polished surfaces 15a and 15b.

As known, the refractive material having an index gradient of a self-focusing lens has an optical refractive index which has a parabolic distribution along a radial axis, passing through a maximum at the centre of the bar. A median light beam entering via one of the plane surfaces at an angle of incidence smaller than the maximum acceptance angle, is propagated within the barrel along a sinusoidal trajectory in view of the index variation.

A lens of this kind offers many advantages. Amongst these, it is possible in particular for lenses of very short focal length and small diameter to be easily obtained, and above all the focal distance is simply determined by the length of the bar.

As a matter of fact, it is possible to define a period, which is currently referred to by the term "pitch", which corresponds to the period of the sinusoidal function. In particular, this period depends on the material forming the lens and on having a precise variation of the refractive index along a radial axis. This may be obtained from tables or by calculation. A lens of this kind is proposed as a standard component in industry, in particular under the trade mark SELFOC.

Furthermore, this kind of lens has a very particular physical property, defined by what are currently referred to as chromatic aberrations. As a matter of fact, a lens of this kind has a variation of its optical refractive index with respect to each wavelength. Thus, the median light beams of different wavelength which are propagated in a sinusoidal form within the lens have different periods, so that these different light beams are out of phase. As a result, a spatial shift or decoupling of the different wavelengths is obtained, which is defined as a function of the length of the lens.

The invention has as its basis the research for a maximum spatial displacement caused by the chromatic dispersion of a self-focusing lens, in order to permit maximum decoupling of the return wavelength from the outgoing wavelengths.

Thus, in FIG. 2, the lens 15 having a diameter of the order of 1 to 2 millimeters, is cut at right angles to its axis YY' at a length L, for example equal to 60 mms, which is determined experimentally or by calculation, in a manner such that the spatial separation between the direction of propagation of the mean optical signal at the two multiplexed outgoing wavelengths $\lambda_1+\lambda_2$ penetrating via the surface 15b of the lens and the direction of propagation of the mean optical signal at the return wavelength $\lambda_0$ emerging via this same surface 15b after propagation within the lens, is a maximum. This spatial separation is defined at the level of the surface 15b of the lens, on the one hand by the distance $\Delta X$ between the two mean light beams ($\lambda_1+\lambda_2$ and $\lambda_0$) and on the other hand by the angle $\theta$ between these same two mean light beams, $\theta$ being the angular separation between the gradients of the two sinusoidal light waves within the lens. A maximum separation is consequently obtained at the level of the surface 15b of the lens between the multiplexed outgoing wavelengths and the return wavelength, so that this return wavelength $\lambda_0$ is completely decoupled from the two multiplexed outgoing wavelengths $\lambda_1+\lambda_2$.

As a result, the self-focusing lens 15 assures the extraction of the return wavelength $\lambda_0$ independently of the interferential filter 11 by effecting maximum decoupling of the same from the outgoing wavelengths $\lambda_1$ and $\lambda_2$, by reason of the spatial displacement caused by the chromatic dispersion of the lens.

It will be observed that the intermediate fibre 12 is positioned substantially parallel to the axis YY' of the self-focusing lens 15 and at a distance x from the same in a manner such as to cause the mean optical signal at the two outgoing wavelengths multiplexed to penetrate into the lens to obtain the maximum vertical spacing defined by the distance CD, C being the point of entry of the mean optical signal at the two multiplexed outgoing wavelengths $\lambda_1 + \lambda_2$ and D being the output point of the mean optical signal at the return wavelength $\lambda_0$ after propagation in the lens.

Furthermore, the connecting fibre 30 is so positioned, for example by bonding, with respect to the surface 15a of the self-focusing lens 15 at a distance x' from the axis YY' of the lens, that the optical signal at the two multiplexed outgoing wavelengths penetrates into the fibre after propagation in the lens 15 and that the optical signal at the return wavelength transmitted by the fibre is propagated in the lens of which the length is such that the spatial separation defined by the parameters $\Delta X$ and $\theta$ is a maximum.

The demultiplexer associated with the multiplexer 10 of FIG. 2 and which is devised in a wholly similar manner to that described with reference to FIG. 2, has been illustrated at 20 in FIG. 3.

More specifically in FIG. 3, the optical connecting fibre 30 has a surface 30b acting as an output surface for the optical signal at the two multiplexed wavelengths $\lambda_1 + \lambda_2$ after propagation in the fibre, and as an input surface for the optical signal at the return wavelength $\lambda_0$.

The self-focusing lens 15 is situated between the output-input surface of the fibre 30 and an interferential filter 22 carried by an intermediate optical fibre 23 of the same kind as that referenced 12 in FIG. 2. The interferential filter 22 consequently receives the mean optical signal at the two multiplexed outgoing wavelengths $\lambda_1 + \lambda_2$ and is arranged so as to operate in a transmission mode for the wavelength $\lambda_1$ which is then propagated in the fibre 23, and reflectively for the wavelength $\lambda_2$, the demultiplexing between the two outgoing wavelengths $\lambda_1$ and $\lambda_2$ being thus produced by selection.

As before, the lens 15 has a given length L such that the spatial separation defined by the parameters $\Delta X$ and $\theta$ is a maximum, C in this case being the output point of the mean optical signal at the two multiplexed wavelengths $\lambda_1 + \lambda_2$ after propagation in the lens, and the input point of the mean optical signal at the return wavelength $\lambda_0$ injected direct at a given angle of incidence at the level of the surface 15b of the lens, in a manner such as to obtain the said maximum spatial separation.

As a result, the self-focusing lens 15 assures the transmission of the return wavelength $\lambda_0$ independently of the interference filter 22 by decoupling the same from the outgoing wavelengths $\lambda_1$ and $\lambda_2$ due to the maximum spatial separation caused by the chromatic dispersion of the lens.

FIG. 4a illustrates a preferred form of the self-focusing lens 15 utilised within the scope of the multiplexer 10 illustrated in FIG. 2. On its plane and polished surface 15b, being that through which penetrates the optical signal at the two multiplexed outgoing wavelengths $\lambda_1 + \lambda_2$ and through which emerges the optical signal at the return wavelength $\lambda_0$ after propagation in the lens, the lens 15 carries a microprism 17 of which the cross-section is a right-angled triangle having a given apex angle $\beta$ of the order of 10° for example, subtended between the hypotenuse and the long side of the triangle. This prism 17 has a given homogenous index and is affixed, for example by bonding, throughout the height of the surface 15b of the lens of length L defined as being the length for which a maximum separation is obtained between the two sinusoidal light waves.

The presence of this microprism 17 provides an improvement to the lens 15 inasmuch as it allows of enhancing the spatial separation between the direction of propagation of the mean optical signal at the two multiplexed outgoing wavelengths $\lambda_1 + \lambda_2$ and that of the mean optical signal at the return wavelength $\lambda_0$. The parameters of the new spatial separation at the level of the oblique surface in the cross-section of the prism, enabling securing optimum decoupling between the return wavelength and the outgoing wavelengths, have been illustrated at $\Delta X'$ and $\theta'$. It will be observed that $\Delta X'$ and $\theta'$ are defined as before, $\Delta X'$ representing the distance EF in which E is the input point of the mean optical signal at the two multiplexed outgoing wavelengths $\lambda_1 + \lambda_2$ and in which F is the output point of the mean optical signal at the return wavelength $\lambda_0$ after propagation in the lens.

The positioning of the microprism 17 on the self-focussing lens 15 may be performed in a different manner, as illustrated in FIG. 4b. The lens 15 having a length L' greater than L is bevelled at its extremity at a given angle $\gamma$ of the order of 80° and then polished, in such a manner that a maximum separation is obtained between the two sinusoidal light waves for the given length L at the level of the bevelled surface 15b of the lens. The prism 17 having an apex angle $\beta$ of the order of 10° is then positioned on the bevelled surface 15b of the lens, in a manner such that the new spatial separation defined by its parametes $\Delta X'$ and $\theta'$ makes it possible to establish optimum decoupling of the return wavelength from the outgoing wavelengths as in the case of FIG. 4a.

The prism 17 illustrated in FIGS. 4a and 4b has a given and homogenous, that is to say constant, refractive index with which the spatial separation defined by the parameters $\Delta X'$ and $\theta'$ is obtained.

According to another embodiment, illustrated in FIG. 5, which also relates to the prism 17 as illustrated in FIG. 4a, the same is formed in two parts and has a non-homogenous refractive index. A first prism part 17a of given index n receives only the optical signal at the two multiplexed outgoing wavelengths $\lambda_1 + \lambda_2$, and a second part 17b of given index n' differing from n receives only the optical signal at the return wavelength $\lambda_0$. This prism having a non-homogenous index makes it possible to obtain an even greater increase of the spatial separation between the direction of propagation of the mean optical signal at the two multiplexed outgoing wavelengths $\lambda_1 + \lambda_2$ and that of the mean optical signal at the return wavelength $\lambda_0$, thereby assuring perfect decoupling between the return wavelength and the outgoing wavelengths. The parameters of the new spatial separation defined as before have been illustrated at $\Delta X''$ and $\theta''$, $\Delta X''$ being the distance GH in which G is the input point of the mean optical signal at the two multiplexed outgoing wavelengths $\lambda_1 + \lambda_2$, and in which H is the output point of the mean optical signal at the return wavelength $\lambda_0$.

Obviously, this non-homogenous index prism may also be utilised with the embodiment illustrated in FIG. 4b.

FIGS. 4a, 4b and 5 have been described in the foregoing within the ambit of the multiplexer (FIG. 2) but certainly remain entirely valid within the scope of the demultiplexer 20 illustrated in FIG. 3, simply by reversing direction of the arrows of $\lambda_0$ and of $\lambda_1+\lambda_2$.

It will be observed that the bidirectional three-channel optical multiplexer-demultiplexer described in the foregoing could equally be employed for a generalised bidirectional connection comprising more than three channels.

Thus, for example, for a bidirectional connection comprising five channels of which four are outgoing channels and one a return channel, the multiplexer illustrated diagrammatically in FIG. 6 comprises a first assembly defined by the interference filter 11 for the multiplexing of the first two outgoing wavelengths $\lambda_1$ and $\lambda_2$, the self-focusing lens 15 assuring decoupling between the multiplexed outgoing wavelengths $\lambda_1+\lambda_2$ the return wavelength $\lambda_0$ as described in the foregoing, and a bidirectional intermediate junction fibre 41 of the multimode type having an index jump or an index gradient transmitting the multiplexed outgoing wavelengths $\lambda_1+\lambda_2$ and the return wavelength $\lambda_0$.

The second assembly of the multiplexer comprises an interference filter 43 deposited on an optical fibre 44 and designed for multiplexing the other two wavelengths $\lambda_3$ and $\lambda_4$ in a manner analogous to that of the filter 11, a self-focusing lens 45 having a longitudinal axis coinciding with the optical axis of the fibre 44 and optically coupled to the latter by means of a microlens 47 in order to optimise the light energy coupling, and a uni-directional junction intermediate fibre 48 transmitting the multiplexed outgoing wavelengths $\lambda_3+\lambda_4$ after propagation in the lens 45.

As apparent from FIG. 6, the two junction fibres 41 and 48 are coupled to the connecting fibre 30 of which one extremity is bevelled in gable form. The connecting fibre 30 is bevelled into two parts 50a and 50b, each forming a given projection angle $\alpha_1$ for example equal to 60°. This angle $\alpha_1$ is selected in a manner such as to increase the value of the angle of acceptance of the multimode fibre 30.

The two junction fibres 41 and 48 are coupled, respectively, to the two bevelled parts 50a and 50b of the connecting fibre 30, so that the maximum of light energy at each wavelength is injected into the fibre. Thus, in order to secure this maximum coupling, each junction fibre is positioned at a point in space established by experiment by an angle $\theta_1$ (or $\theta'_1$) formed by the longitudinal axis of the junction fibre with the perpendicular NN' to the bevelled surface, by the distance $x_1$ (or $x'_1$) between the junction fibre and the bevelled surface, and by the distance $y_1$ (or $y'_1$) between the junction fibre and the extreme point 0 of the bevelled surface.

The positioning of the junction fibres with respect to the bevelled surfaces of the connecting fibre has been exagerated deliberately in FIG. 6 as in FIG. 7 for the sake of clarity.

The junction fibre 41 carries an interference filter 52 of the dielectric multilayer type, designed to operate transmissively for both the multiplexed outgoing wavelength $\lambda_1+\lambda_2$ and for the return wavelength $\lambda_0$, and in reflection only for the other multiplexed outgoing wavelengths $\lambda_3+\lambda_4$.

Similarly, the junction fibre 48 carries an interference filter 53 designed to operate transmissively only for the multiplexed outgoing wavelengths $\lambda_3+\lambda_4$, and in reflection for the other multiplexed outgoing wavelengths $\lambda_1+\lambda_2$ and for the return wavelength $\lambda_0$.

The optical signals at the multiplexed outgoing wavelengths $\lambda_1+\lambda_2$ and $\lambda_3+\lambda_4$ transmitted by the two junction fibres 41 and 48 consequently penetrate, after passage through the two transmissively operating interference filters 52 and 53, into the connecting fibre 30 through its two bevelled parts, which effects the multiplexing of the outgoing wavelengths $\lambda_1+\lambda_2+\lambda_3+\lambda_4$ in the connecting fibre 30, whereas the return wavelength $\lambda_0$ is received, after selection by the interference filter 52, by the bidirectional junction fibre 41.

The demultiplexer associated with this bidirectional five-channel multiplexer is produced in a manner quite analogous to the foregoing, whilst incorporating the appropriate modifications within the capabilities of one skilled in the art.

By way of another example illustrated in FIG. 7 for a bidireotional six-channel connection, of which four are outgoing channels and two are return channels, the multiplexer comprises a first assembly formed by the interference filter 11 for the multiplexing of the first two outgoing wavelengths $\lambda_1$ and $\lambda_2$, the self-focusing lens providing decoupling between the multiplexed outgoing wavelengths $\lambda_1+\lambda_2$ and the first return wavelength $\lambda_0$, and the bidirectional junction fibre 41 transmitting the multiplexed outgoing wavelengths $\lambda_1+\lambda_2$ and the return wavelength $\lambda_0$.

The second assembly of the multiplexer comprises the interference filter 43 for multiplexing the two other outgoing wavelengths $\lambda_3+\lambda_4$, a self-focusing lens 55 of the same kind as that referenced 15 and assuring decoupling between the multiplexed outgoing wavelengths $\lambda_3+\lambda_4$ and the second return wavelength $\lambda'_0$, and the bidirectional function fibre 48 transmitting the multiplexed outgoing wavelengths $\lambda_3+\lambda_4$ and the return wavelength $\lambda'_0$.

The two junction fibres 41 and 48 are coupled to the connecting fibre 30 in a manner analogous to that described with regard to FIG. 6, and two interference filters 57 and 58 are deposited on the extremity of the junction fibres 41 and 48. More specifically, the interference filter 57 is designed for simultaneous transmissive operation for the multiplexed outgoing wavelengths $\lambda_1+\lambda_2$ and for the return wavelength $\lambda_0$, and for reflective operation for the other multiplexed outgoing wavelengths $\lambda_3+\lambda_4$ and for the other return wavelength $\lambda'_0$, whereas the interference filter 58 is designed in a reversed manner.

In this way, the optical signals at the multiplexed outgoing wavelengths $\lambda_1+\lambda_2$ and $\lambda_3+\lambda_4$ transmitted by the two junction fibres penetrate, after passage through the two interference filters 57 and 58 operating transmissively, into the connecting fibre 30 wherein occurs the multiplexing of the outgoing wavelengths $\lambda_1+\lambda_2+\lambda_3+\lambda_4$, whereas the two other return wavelengths $\lambda_0$ and $\lambda'_0$ are received, respectively by the two bidirectional junction fibres 41 and 48 after selection by the interference filters 57 and 58.

The demultiplexer associated with this bidirectional six-channel multiplexer is equally produced in an analogous manner by incorporating the appropriate modifications within the capability of one skilled in the art.

What is claimed is:

1. A wavelength multiplexer for bidirectional connection, comprising an optical connecting fibre intended for transmission in one direction of an optical signal of at least two multiplexed wavelengths referred to as outgoing wavelengths and for transmission in the other direction of an optical signal of at least one return wavelength, said connecting fibre having a surface acting as an input surface for the outgoing wavelengths and as an output surface for the return wavelength, optical filtering means for multiplexing the outgoing wavelengths, a self-focusing lens situated between the input-output surface of the fibre and the output of said optical filtering means and which delivers the signal of multiplexed outgoing wavelengths, in the form of a cylindrical bar of given length and of a refractive material having an index gradient and delimited by two surfaces, the length of said lens being such that the spatial separation between the direction of propagation of the optical signal at the multiplexed outgoing wavelengths penetrating through one of the surfaces of the lens and that of the optical signal at the return wavelength outputting through this same surface after propagation in the lens is maximum, thus permitting decoupling the return wavelength from the outgoing wavelengths, said connecting fibre being so positioned with respect to the other surface of the lens that the optical signal at the multiplexed outgoing wavelengths penetrates into the fibre after propagation in the lens, wherein said self-focusing lens of a given length comprises, on its surface through which enters the optical signal at the multiplexed outgoing wavelengths and through which emerges the optical signal at the return wavelength after propagation in the lens, a prism having as its cross-section a right-angled triangle of which the hypotenuse subtends a given angle with a selected other side of the triangle affixed throughout the said surface of the lens, each optical signal passing through said prism, thus permitting securing a maximum spatial separation between the direction of propagation of the optical signal at the multiplexed outgoing wavelengths penetrating into the prism and that of the optical signal at the return wavelength emerging from the prism after propagation in the lens.

2. A multiplexer according to claim 1, wherein each of the two surfaces of said self-focusing lens is plane and polished.

3. A wavelength multiplexer for bidirectional connection, comprising an optical connecting fibre intended for transmission in one direction of an optical signal of at least two multiplexed wavelengths referred to as outgoing wavelengths and for transmission in the other direction of an optical signal of at least one return wavelength, said connecting fibre having a surface acting as an input surface for the outgoing wavelengths and as an output surface for the return wavelength, optical filtering means for multiplexing the outgoing wavelengths, a self-focusing lens situated between the input-output surface of the fibre and the output of said optical filtering means and which delivers the signal of multiplexed outgoing wavelengths, in the form of a cylindrical bar of given length and of a refractive material having an index gradient and delimited by two surfaces, the length of said lens being such that the spatial separation between the direction of propagation of the optical signal at the multiplexed outgoing wavelengths penetrating through one of the surfaces of the lens and that of the optical signal at the return wavelength outputting through this same surface after propagation in the lens is maximum, thus permitting decoupling the return wavelength from the outgoing wavelengths, said connecting fibre being so positioned with respect to the other surface of the lens that the optical signal at the multiplexed outgoing wavelengths penetrates into the fibre after propagation in the lens, wherein the surface of said self-focusing lens through which enters the optical signal at the multiplexed outgoing wavelengths and through which outputs the optical signal at the return wavelength after propagation in said lens is bevelled at a given angle, and wherein said lens comprises a prism having as its cross-section a right-angled triangle of which the hypotenuse is affixed throughout the said bevelled surface of the lens, each optical signal passing through said prism, thus permitting securing a maximum spatial separation between the direction of propagation of the optical signal at the multiplexed outgoing wavelengths penetrating into the prism and that of the optical signal at the return wavelength emerging from the prism after propagation in the lens.

4. A multiplexer according to claim 1 or 3, wherein said prism has a constant given refractive index.

5. A multiplexer according to claim 1 or 3, wherein said prism comprises a first part having a given refractive index into which penetrates the optical signal at the multiplexed outgoing wavelengths, and a second part having a given refractive index differing from that of the first part and through which emerges the optical signal at the return wavelength after propagation in the lens.

6. A wavelength multiplexer for bidirectional connection, comprising an optical connecting fibre intended for transmission in one direction of an optical signal of at least two multiplexed wavelengths referred to as outgoing wavelengths and for transmission in the other direction of an optical signal of at least one return wavelength, said connecting fibre having a surface acting as an input surface for the outgoing wavelengths and as an output surface for the return wavelength, optical filtering means for multiplexing the outgoing wavelengths, a self-focusing lens situated between the input-output surface of the fibre and the output of said optical filtering means and which delivers the signal of multiplexed outgoing wavelengths, in the form of a cylindrical bar of given length and of a refractive material having an index gradient and delimited by two surfaces, the length of said lens being such that the spatial separation between the direction of propagation of the optical signal at the multiplexed outgoing wavelengths penetrating through one of the surfaces of the lens and that of the optical signal at the return wavelength outputting through this same surface after propagation in the lens is maximum, thus permitting decoupling the return wavelength from the outgoing wavelengths, said connecting fibre being so positioned with respect to the other surface of the lens that the optical signal at the multiplexed outgoing wavelengths penetrates into the fibre after propagation in the lens, wherein said optical filtering means comprise an interference filter deposited on the output surface bevelled at a given angle of an intermediate optical fibre, the filter receiving the outgoing wavelengths of which at least one is transmitted by the intermediate fibre, and multiplexing these outgoing wavelengths in the form of an optical signal penetrating through one of the surfaces of the lens.

7. A wavelength demultiplexer for bidirectional connection, comprising an optical connecting fibre transmitting an optical signal of at least two multiplexed outgoing wavelengths in one direction, and intended for transmission in the other direction of an optical signal of at least one return wavelength, said connecting fibre having a surface acting as an output surface for the outgoing wavelengths and at the same time as an input surface for the return wavelength, optical filtering means for demultiplexing the outgoing wavelengths transmitted by the fibre, a self-focusing lens situated between the output-input surface of the fibre and the trating through this same surface is a maximum, thus enabling decoupling the return wavelength from the outgoing wavelengths, said connecting fibre being so positioned with respect to the other surface of the lens in a manner such that the optical signal at the return wavelength penetrates into the fibre after propagation in the lens, wherein the surface of said self-focusing lens through which outputs the optical signal at the multiplexed outgoing wavelengths after propagation in the lens and through which enters the optical signal at the return wavelength is bevelled at a given angle, and wherein said lens comprises a prism having as its cross-